(12) United States Patent
Uppinkere et al.

(10) Patent No.: US 9,100,504 B2
(45) Date of Patent: Aug. 4, 2015

(54) SMART CONTROL OF AN ALERT OF AN INCOMING COMMUNICATION TO A DATA PROCESSING DEVICE

(71) Applicant: NVIDIA Corporation, Santa Clara, CA (US)

(72) Inventors: Darshan Uppinkere, Maharashtra (IN); Jithin Thomas, Maharashtra (IN)

(73) Assignee: NVIDIA Corporation, Santa Clara, CA (US)

( * ) Notice: Subject to any disclaimer, the term of this patent is extended or adjusted under 35 U.S.C. 154(b) by 2 days.

(21) Appl. No.: 13/938,269

(22) Filed: Jul. 10, 2013

(65) Prior Publication Data

US 2015/0018048 A1    Jan. 15, 2015

(51) Int. Cl.
*H04B 1/38* (2006.01)
*H04M 19/04* (2006.01)

(52) U.S. Cl.
CPC .................................. *H04M 19/047* (2013.01)

(58) Field of Classification Search
USPC ......................................................... 455/567
See application file for complete search history.

(56) References Cited

U.S. PATENT DOCUMENTS

| 5,995,852 A | 11/1999 | Yasuda et al. |
| 7,469,155 B2 | 12/2008 | Chu |
| 8,285,339 B2 | 10/2012 | Shin |
| 2008/0139167 A1 | 6/2008 | Burgess |
| 2009/0325647 A1* | 12/2009 | Cho et al. ...................... 455/567 |
| 2010/0159998 A1* | 6/2010 | Luke et al. ..................... 455/567 |
| 2013/0016819 A1 | 1/2013 | Cheethirala |
| 2013/0094668 A1 | 4/2013 | Poulsen et al. |

FOREIGN PATENT DOCUMENTS

| EP | 1585292 | 10/2005 |
| EP | 1585292 A1 | 10/2005 |

\* cited by examiner

*Primary Examiner* — Joel Ajayi
(74) *Attorney, Agent, or Firm* — Zilka-Kotab, PC

(57) ABSTRACT

A method includes determining, through a processor of a data processing device in conjunction with one or more sensor(s) associated therewith, an intent of a user of the data processing device to respond to an alert of an incoming communication thereto expressed through a sound volume level and/or a vibrational level of the alert. The method also includes automatically reducing, through the processor, the sound volume level and/or the vibrational level of the alert following the determination of the intent of the user to respond to the alert.

18 Claims, 5 Drawing Sheets

SMART CONTROL OF AN ALERT OF AN INCOMING COMMUNICATION TO A DATA PROCESSING DEVICE

FIELD OF TECHNOLOGY

This disclosure relates generally to data processing devices and, more particularly, to a method, a device and/or a system of smart control of an alert of an incoming communication to a data processing device.

BACKGROUND

A user of a data processing device (e.g., a mobile phone) may be alerted of an incoming communication (e.g., a phone call) thereto through a sound volume level and/or a vibrational level of the alert. In an example scenario, the user of a mobile phone may be in an official setting. The user may receive a phone call, which is indicated through a ringtone. The user may have forgotten to mute his/her mobile phone. Even if the user voluntarily keeps the mobile phone in a normal mode of operation thereof, prolonged indication of the incoming communication through the ringtone may be a source of nuisance and/or embarrassment to the user and/or persons around the user. The indication may continue until the user intervenes through an interface of the mobile phone to turn off the alert.

SUMMARY

Disclosed are a method, a device and/or a system of smart control of an alert of an incoming communication to a data processing device.

In one aspect, a method includes determining, through a processor of a data processing device in conjunction with one or more sensor(s) associated therewith, an intent of a user of the data processing device to respond to an alert of an incoming communication thereto expressed through a sound volume level and/or a vibrational level of the alert. The method also includes automatically reducing, through the processor, the sound volume level and/or the vibrational level of the alert following the determination of the intent of the user to respond to the alert.

In another aspect, a non-transitory medium, readable through a data processing device and including instructions embodied therein that are executable through the data processing device, is disclosed. The non-transitory medium includes instructions to determine, through a processor of the data processing device in conjunction with one or more sensor(s) associated therewith, an intent of a user of the data processing device to respond to an alert of an incoming communication thereto expressed through a sound volume level and/or a vibrational level of the alert. The non-transitory medium also includes instructions to automatically reduce, through the processor, the sound volume level and/or the vibrational level of the alert following the determination of the intent of the user to respond to the alert.

In yet another aspect, a data processing device includes a memory, one or more sensor(s), and a processor communicatively coupled to the memory and the one or more sensor(s). The processor is configured to execute instructions to determine an intent of a user of the data processing device to respond to an alert of an incoming communication thereto expressed through a sound volume level and/or a vibrational level of the alert in conjunction with the one or more sensor(s). The processor is also configured to execute instructions to automatically reduce the sound volume level and/or the vibrational level of the alert following the determination of the intent of the user to respond to the alert.

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a device and/or a system of smart control of an alert of an incoming communication to a data processing device. Although the present embodiments have been described with reference to specific example embodiments, it will be evident that various modifications and changes may be made to these embodiments without departing from the broader spirit and scope of the various embodiments.

Figure 1:
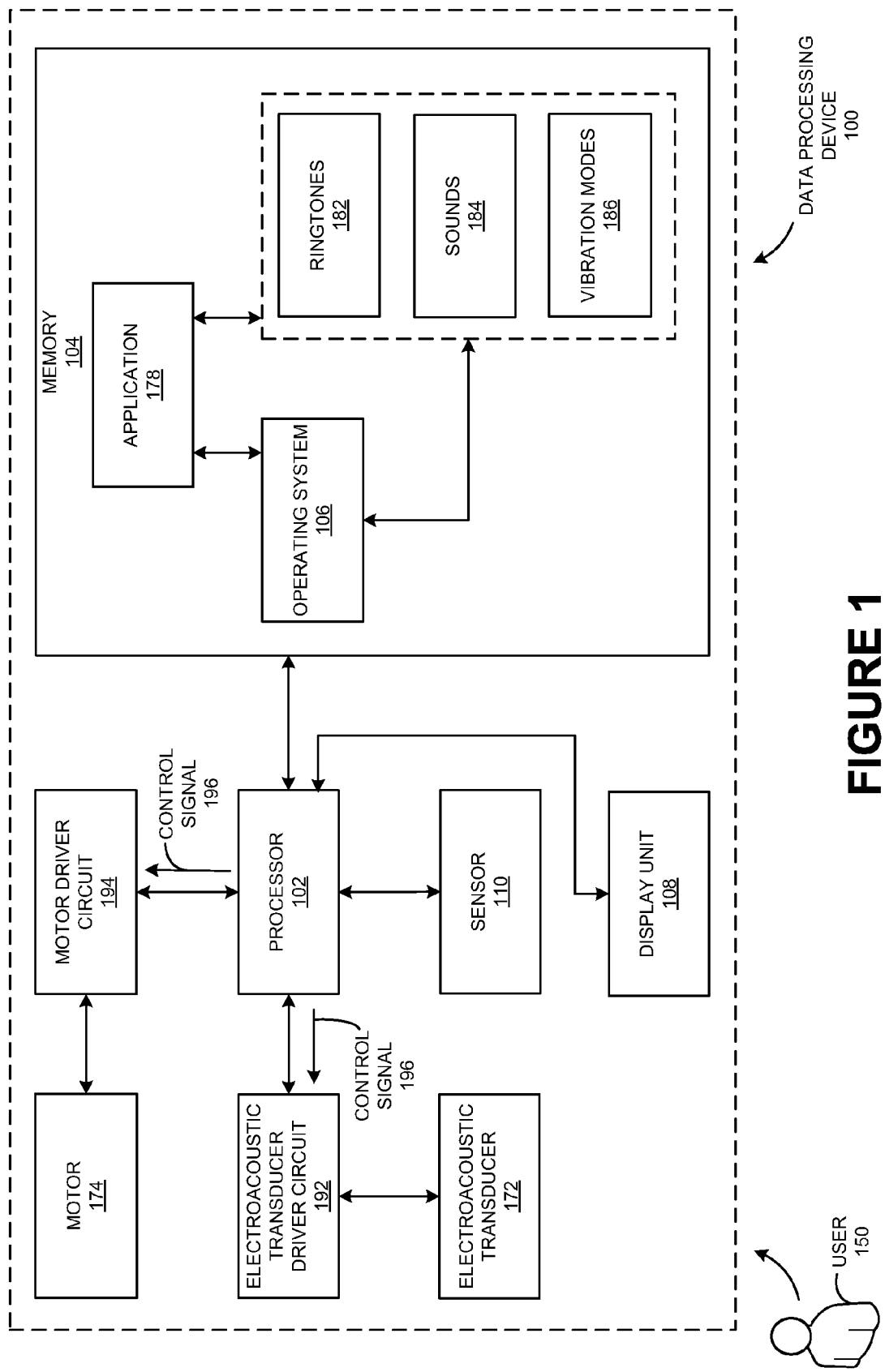
FIG. 1 is a schematic view of a data processing device, according to one or more embodiments.

FIG. 1 shows a data processing device 100, according to one or more embodiments. In one or more embodiments, data processing device 100 may be a desktop computer, a laptop computer, a notebook computer, a netbook or a mobile device such as a mobile phone. Other forms of data processing device 100 are within the scope of the exemplary embodiments discussed herein. In one or more embodiments, data processing device 100 may include a processor 102 (e.g. a Central Processing Unit (CPU), a Graphics Processing Unit (GPU), a microprocessor) communicatively coupled to a memory 104 (e.g., a volatile memory and/or a non-volatile memory); memory 104 may include storage locations configured to be addressable through processor 102.

In one or more embodiments, data processing device 100 may execute an operating system 106 thereon; FIG. 1 shows instructions associated with operating system 106 being stored in memory 104. In one or more embodiments, data processing device 100 may have a sensor 110 associated therewith to detect an intent of a user 150 of data processing device 100 to respond to an alert of an incoming communication therethrough in conjunction with processor 102; FIG. 1 shows sensor 110 being interfaced with processor 102. In one or more embodiments, the intent of user 150 may be determined based on a contact of user 150 with data processing device 100 and/or a motion of data processing device 100 relative to a current position thereof. For example, the incoming communication may be a phone call, a text message, a video message, an electronic mail (e-mail), an alarm notification and/or an event notification. Other forms of notifications of processes may be reasonably interpreted as forms of the incoming communication.

In one or more embodiments, sensor 110 may be a touch sensor to detect the contact by user 150 indicative of the intent thereof. For example, data processing device 100 may have ringtones (e.g., ringtones 182), sounds (e.g., sounds 184) and/or vibration modes (e.g., vibration modes 186) thereof stored in memory 104. During an incoming phone call to a mobile phone (example data processing device 100), one or more of the ringtones and/or the sounds may be utilized to alert user 150 of the incoming communication. Prolonged duration of the aforementioned one or more of the ringtones and/or sounds may serve as a nuisance to user 150 and/or persons around user 150 and/or as a source of personal embarrassment to user 150. Exemplary embodiments provide for sensing the intent of user 150 to pick up the mobile phone to answer the phone call in conjunction with processor 102, which enables automatic reduction of a sound volume level and/or a vibrational level of the alert following the sensing of the intent of user 150 to respond to the alert.

In an example scenario of user 150 being in an official meeting and the mobile phone (example data processing device 100) set in a vibration mode thereof being placed on a table, any incoming alert having vibration(s) associated therewith may also have a sound volume level associated therewith due to contact of the mobile phone with the table. Said sound volume level may disturb persons in the vicinity of user 150. Exemplary embodiments may enable reduction of the vibrational level of the alert to mitigate the sound volume level due to the contact of the mobile phone with the table.

FIG. 1 also shows an electroacoustic transducer 172 (e.g., a speaker) and a motor 174 configured to generate sounds associated with a ringtone and vibrations related to the alert respectively; processor 102 is shown being interfaced with electroacoustic transducer 172 and motor 174. In other words, electroacoustic transducer 172 may be a source of the sound volume level associated with the alert and motor 174 may be a source of the vibrational level associated with the alert. While FIG. 1 shows both electroacoustic transducer 172 and motor 174 as being part of data processing device 100, the presence of the aforementioned components together is not essential to the practice of concepts associated with the exemplary embodiments. It should further be noted that sources of vibrations other than motor 174 are also within the scope of the exemplary embodiments discussed herein.

Figure 2:
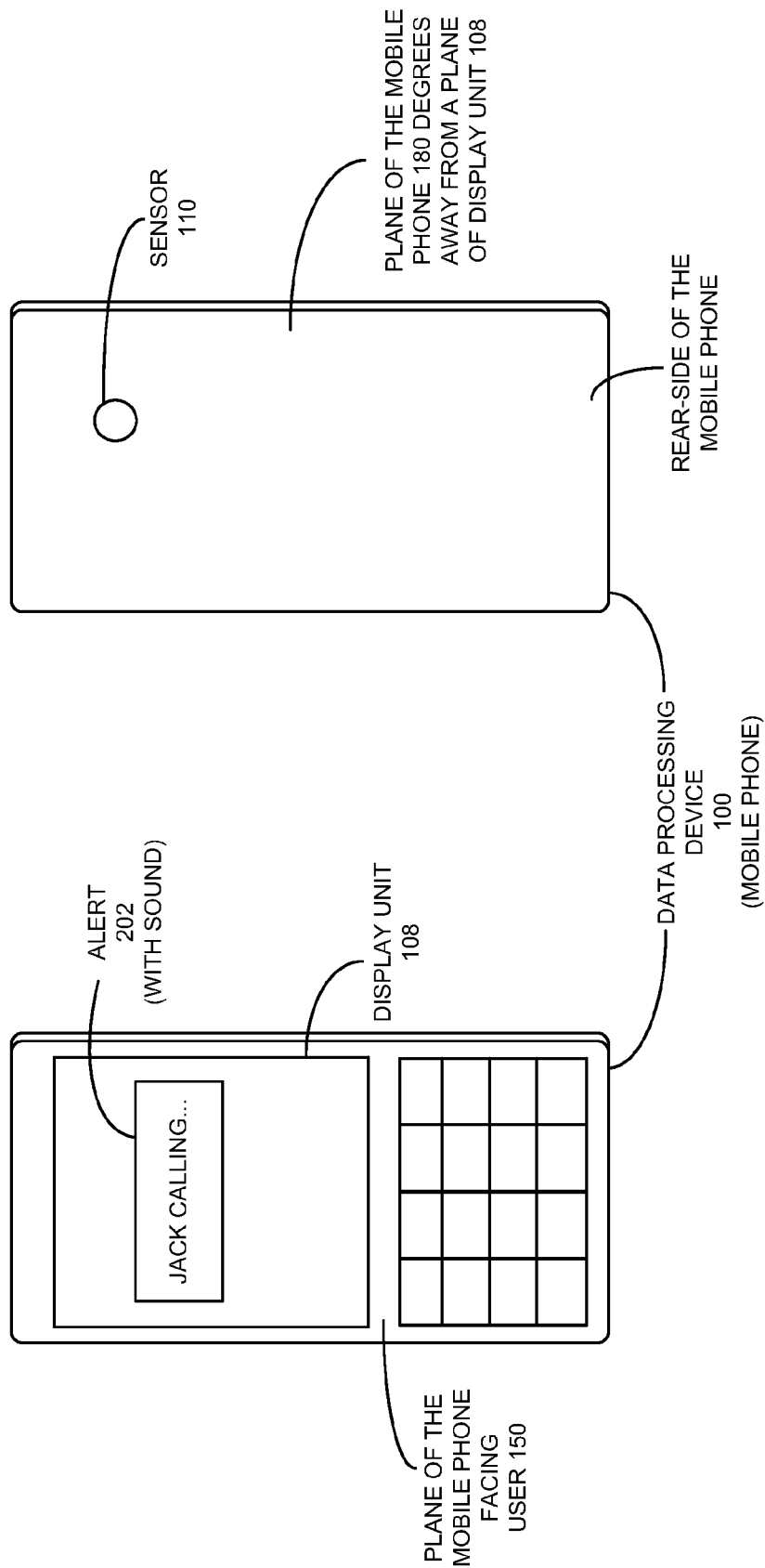
FIG. 2 is a schematic and a perspective view of a mobile phone receiving an alert of an incoming communication thereto.

FIG. 2 shows an example scenario of an alert 202 received through a mobile phone (example data processing device 100). Here, alert 202 may be an incoming phone call that has ringtone 182 associated therewith. In one example embodiment, sensor 110 may be provided on a plane of the mobile phone 180 degrees away from a plane of a display unit 108 (e.g., a Liquid Crystal Display (LCD)) thereof. FIG. 1 shows display unit 108 as being interfaced with processor 102 of data processing device 100. FIG. 2 shows a perspective view of the mobile phone indicating locations of display unit 108 and sensor 110. Sensor 110 may, for example, be a touch sensor configured to sense a touch of user 150 or a motion sensor (e.g., a position sensor, an accelerometer, a gyroscope) configured to detect motion of the mobile phone indicative of user 150 being a cause thereof. When user 150 receives a phone call through the mobile phone, user 150 may physically pick up the mobile phone and, in the process, touch sensor 110 and subject the mobile phone to motion. If sensor 110 is a touch sensor, the touch of user 150 may be sensed; if sensor 110 is a motion sensor, the motion of the mobile phone may be sensed. Both example forms of sensing may indicate intent of user 150 to respond to the phone call.

Figure 3:
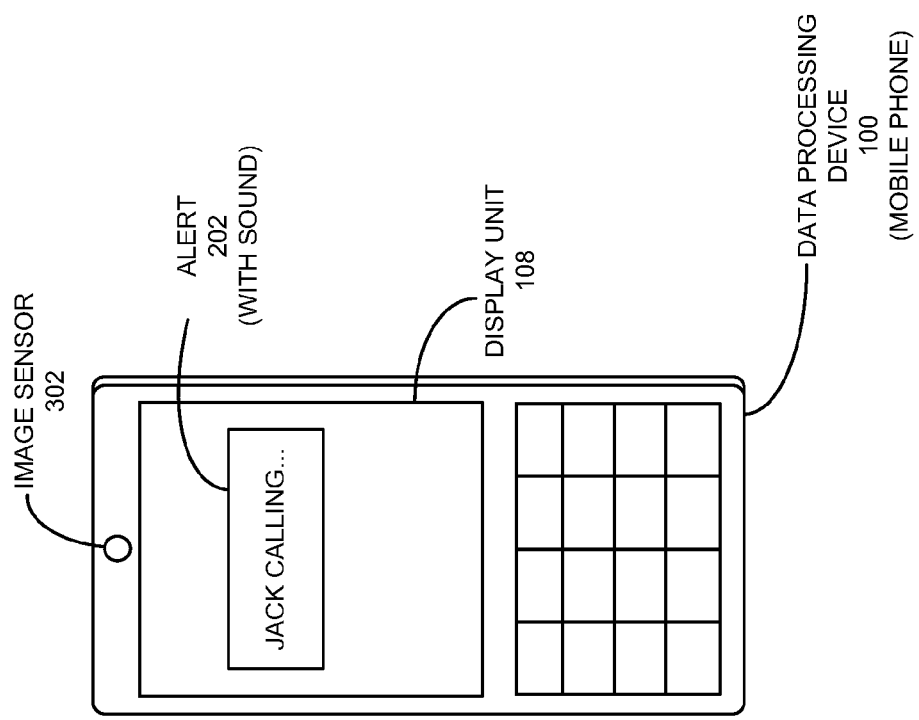
FIG. 3 is a schematic and a perspective view of an image sensor provided on a plane of a display unit of the mobile phone of FIG. 2.

It should be noted that sensor 110 may also be located 90 degrees away from the plane of display unit 108; in other words, sensor 110 may be located at one or both lateral sides of data processing device 100. Further, it should be noted that example forms of sensing are not limited to touch sensing and motion sensing. FIG. 3 shows an image sensor 302 (e.g., a camera; image sensor 302 is an example sensor 110) provided on a plane of display unit 108 facing user 150. When alert 202 is received at the mobile phone, the intent of user 150 to respond thereto may be sensed by image sensor 302 by, for example, capturing an image of user 150 when user 150 faces the plane of display unit 108. In another example embodiment, sensor 110 may be a light sensor configured to sense a change in intensity level of light (e.g., ambient light, light emitted therefrom) when user 150 picks up the mobile phone to respond to alert 202. In yet another example embodiment, sensor 110 may be an antenna configured to sense a change in radiation characteristics when user 150 picks up the mobile phone to respond to alert 202.

All reasonable forms of sensing discussed above are within the scope of the exemplary embodiments discussed herein. Further, it should be noted that more than one sensor 110 or forms of sensor(s) may be implemented in data processing device 100.

In one or more embodiments, the data sensed through sensor 110 may be transmitted to processor 102, which determines the intent of user 150 of data processing device 100 to respond to alert 202 based on the sensed data. Once the intent is determined, processor 102 may transmit a control signal to reduce a sound volume level and/or a vibrational level of alert 202. The aforementioned control signal may enable appropriate control of a corresponding electroacoustic transducer driver circuit and/or a motor driver circuit such that the sound volume level and/or the vibrational level of alert 202 from electroacoustic transducer 172 and/or motor 174 is reduced. It should be noted that reduction in the sound volume level and/or the vibrational level may also include a complete muting of the sound volume and/or the vibration(s).

FIG. 1 shows electroacoustic transducer driver circuit 192 interfaced with electroacoustic transducer 172 and motor driver circuit 194 interfaced with motor 174, according to one or more embodiments. In one or more embodiments, upon determining the intent of user 150 to respond to an alert through data processing device 100, processor 102 may be configured to transmit a control signal 196 to control electroacoustic transducer driver circuit 192 and/or motor driver circuit 194 such that the sound volume level and/or the vibrational level of the alert is reduced. For example, if control signal 196 is a logical 1, then electroacoustic driver circuit 192 and/or motor driver circuit 194 may adjust parameters of electroacoustic transducer 172 and/or motor 174 such that the sound volume level and/or the vibrational level of the alert is reduced.

Figure 4:
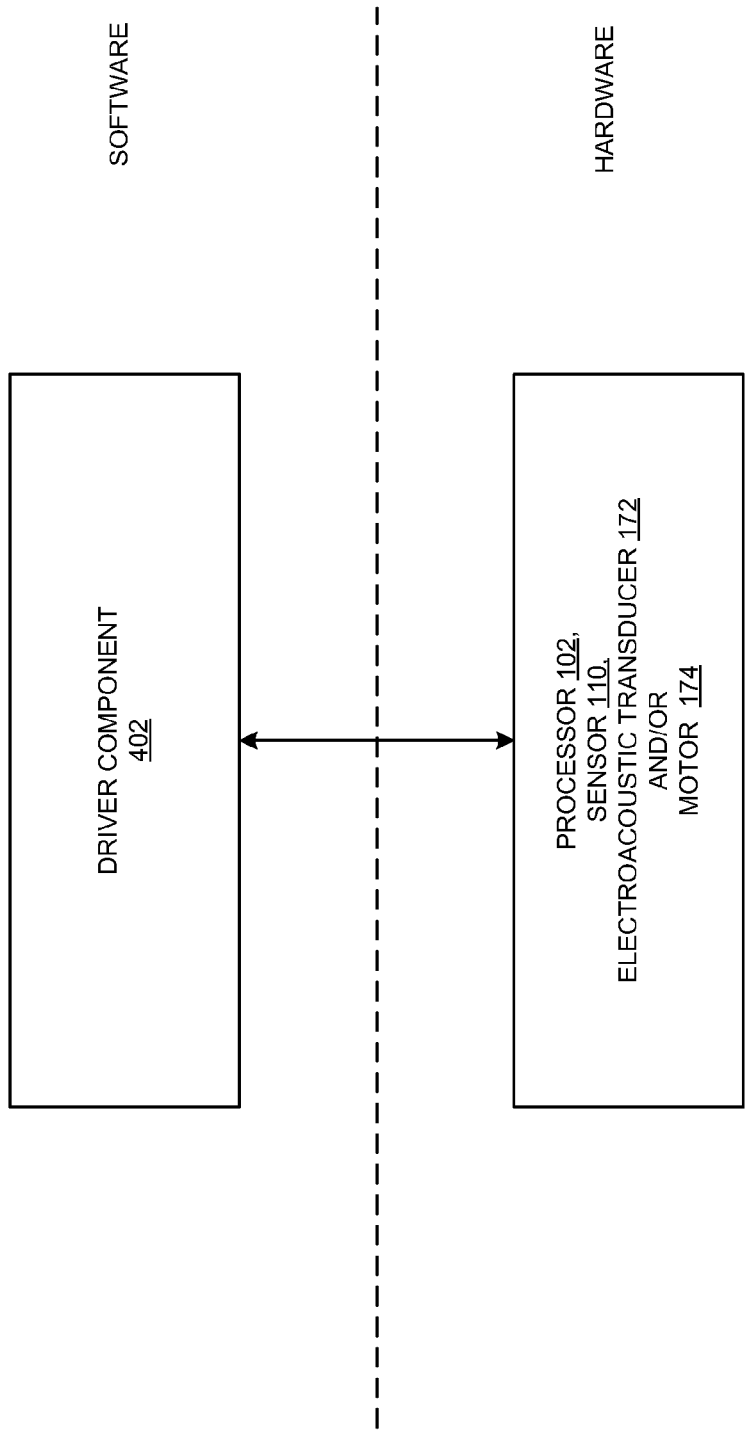
FIG. 4 is a schematic view of interaction between a driver component and a processor, a sensor, an electroacoustic transducer and/or a motor of the data processing device of FIG. 1, according to one or more embodiments.

In one or more embodiments, the sensing of data related to the intent of user 150 to respond to the alert and/or the automatic reduction of the sound volume level and/or the vibrational level may be triggered through a driver component (e.g., a set of instructions) associated with processor 102, sensor 110, electroacoustic transducer 172 and/or motor 174. FIG. 4 shows interaction between a driver component 402 and processor 102, sensor 110, electroacoustic transducer 172 and/or motor 174, according to one or more embodiments. In one or more embodiments, driver component 402 may be packaged with operating system 106 and/or an application 178 executing on data processing device 100 (application 178 is shown in FIG. 1 as being stored in memory 104). In one or more embodiments, driver component 402 may be loaded onto data processing device 100 upon booting thereof, and instructions associated with the sensing and/or the automatic reduction of the sound volume level and/or the vibrational level may execute as foreground processes or background processes.

In one or more embodiments, instructions associated with driver component 402 and the sensing and/or the automatic reduction of the sound volume level and/or the vibrational level may be embodied on a non-transitory medium (e.g., a Compact Disc (CD), a Digital Video Disc (DVD), a Blu-ray Disc®, a hard drive; appropriate instructions may be downloaded to the hard drive) readable through data processing device 100. All reasonable means of providing the aforementioned instructions are within the scope of the exemplary embodiments discussed herein.

Figure 5:
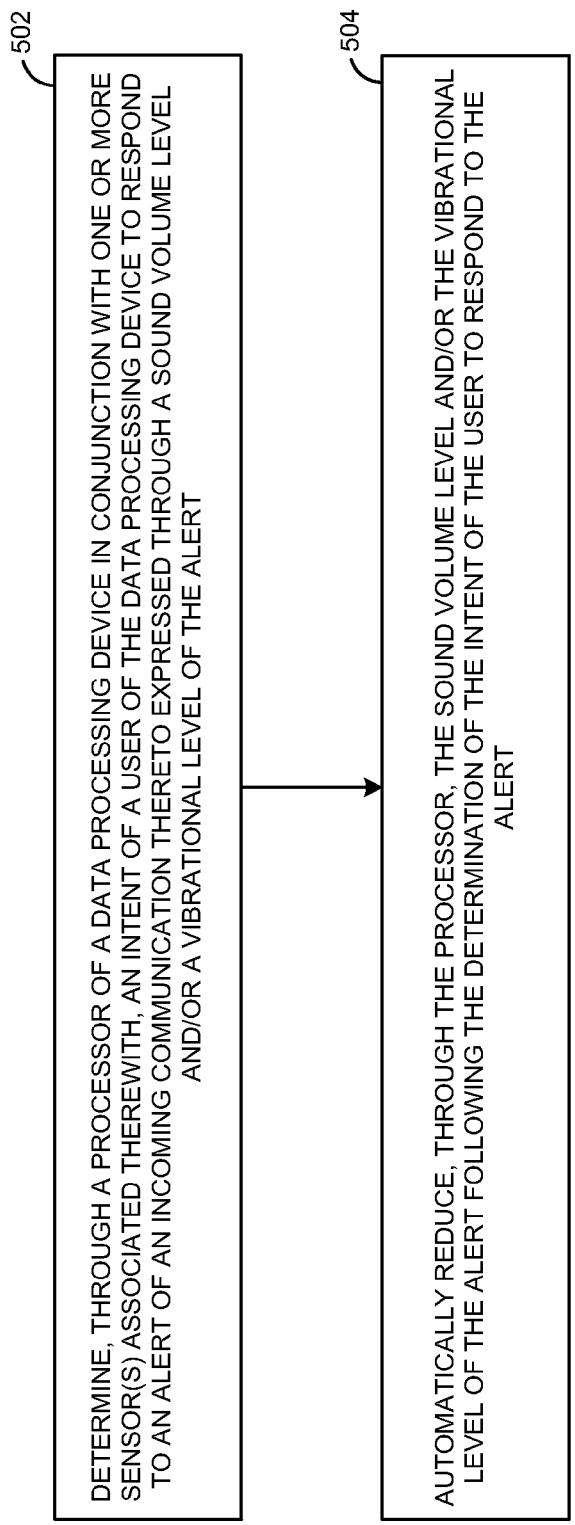
FIG. 5 is a process flow diagram detailing the operations involved in smart control of an alert of an incoming communication to the data processing device of FIG. 1, according to one or more embodiments.

FIG. 5 shows a process flow diagram detailing the operations involved in smart control of an alert of an incoming communication to data processing device 100, according to one or more embodiments. In one or more embodiments, operation 502 may involve determining, through processor 102 in conjunction with one or more sensor(s) (e.g., sensor 110) associated therewith, an intent of user 150 to respond to the alert of the incoming communication to data processing device 100 expressed through a sound volume level and/or a vibrational level of the alert. In one or more embodiments, operation 504 may then involve automatically reducing, through processor 102, the sound volume level and/or the vibrational level of the alert following the determination of the intent of the user to respond to the alert.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., data processing device 100). Accordingly, the specification and drawings are to be regarded in an illustrative rather than a restrictive sense.

What is claimed is:

1. A method comprising:
   generating, at a data processing device, an alert of an incoming communication;
   automatically capturing an image of a user of the data processing device using an image sensor associated with the data processing device when the user faces the image sensor;
   processing, by the data processing device, the captured image to determine
   an intent of the user of the data processing device to respond to the alert of the incoming communication; and
   automatically reducing, through the processor, a vibrational level of the alert based on the determined intent of the user to respond to the alert.

2. The method of claim 1, further comprising a motion sensor configured to detect motion of the data processing device relative to the user and indicative of the user being a cause thereof.

3. The method of claim 1, wherein automatically reducing the vibrational level of the alert comprises triggering, through a driver component, automatic reduction of a corresponding vibrational level of a vibration source in the data processing device in response to a control signal from the processor.

4. The method of claim 1, wherein the incoming communication is at least one of: an incoming phone call, an incoming message, an event notification, an alarm notification and another process having a notification associated therewith.

5. A non-transitory medium, readable through a data processing device and including instructions embodied therein that are executable through the data processing device, comprising:
   instructions to generate, at the data processing device, an alert of an incoming communication;
   instructions to automatically capture an image of a user of the data processing device using an image sensor associated with the data processing device when the user faces the image sensor;
   instructions to process, by the data processing device, the captured image to determine
   an intent of the user of the data processing device to respond to the alert of the incoming communication; and
   instructions to automatically reduce, through the processor, the vibrational level of the alert following the determination of the intent of the user to respond to the alert.

6. The non-transitory medium of claim 5, comprising providing instructions compatible with a motion sensor configured to detect motion of the data processing device relative to the user and indicative of the user being a cause thereof.

7. A data processing device comprising:
   a memory;
   an image sensor associated with the data processing device; and
   a processor communicatively coupled to the memory and the image sensor, the processor being configured to execute instructions to:
   generate, at a data processing device, an alert of an incoming communication;
   automatically capture an image of a user of the data processing device using the image sensor when the user faces the image sensor;
   process, by the data processing device, the captured image to determine an intent of the user of the data processing device to respond to the of the incoming communication; and
   automatically reducing, through the processor, a vibrational level of the alert based on the determined intent of the user to respond to the alert.

8. The data processing device of claim 7, further comprising a motion sensor configured to detect motion of the data processing device relative to the user and indicative of the user being a cause thereof.

9. The data processing device of claim 7, further comprising a driver component to trigger automatic reduction of a corresponding vibrational level of a vibration source in the data processing device in response to a control signal from the processor.

10. The data processing device of claim 7, wherein the incoming communication is at least one of: an incoming phone call, an incoming message, an event notification, an alarm notification and another process having a notification associated therewith.

11. The method of claim 1, further comprising:
   a light sensor configured to sense a change in light intensity level indicative of the user picking up the data processing device; and
   an antenna configured to sense a change in a radiation characteristic thereof indicative of the intent of the user.

12. The method of claim 11, further comprising providing the light sensor on a plane of the data processing device 180 degrees away from a plane of a display unit of the data processing device.

13. The method of claim 1, comprising an antenna configured to sense a change in a radiation characteristic thereof indicative of the intent of the user.

14. The method of claim 1, comprising providing the image sensor on the plane of the display unit of the data processing device and an additional sensor on the data processing device 90 degrees away from the plane of the display unit.

15. The data processing device of claim 7, further comprising:
   a light sensor configured to sense a change in light intensity level indicative of the user picking up the device; and
   an antenna configured to sense a change in a radiation characteristic thereof indicative of the intent of the user.

16. The data processing device of claim 15, further comprising providing the light sensor on a plane of the data processing device 180 degrees away from a plane of a display unit of the data processing device.

17. The data processing device of claim 7, comprising an antenna configured to sense a change in a radiation characteristic thereof indicative of the intent of the user.

18. The data processing device of claim 7, comprising providing the image sensor on the plane of the display unit of the data processing device and an additional sensor on the data processing device 90 degrees away from the plane of the display unit.

* * * * *